US011920956B2

(12) United States Patent
Lymberopoulos et al.

(10) Patent No.: US 11,920,956 B2
(45) Date of Patent: Mar. 5, 2024

(54) OBSTRUCTION DETECTOR ASSEMBLIES, SYSTEMS, AND RELATED METHODS FOR DETECTING OBSTRUCTIONS ALONG OIL AND GAS EQUIPMENT

(71) Applicant: SAFOCO, INC., Houston, TX (US)

(72) Inventors: David Lymberopoulos, Houston, TX (US); Andrew Allen Kadavy, Houston, TX (US); Peter Lanh Ly, Houston, TX (US); James Eric Amberg, Cleveland, TX (US); George F. Sullivan, III, Houston, TX (US); Michael J. Pry, El Lago, TX (US)

(73) Assignee: SAFOCO, INC., Houston, TX (US)

( * ) Notice: Subject to any disclaimer, the term of this patent is extended or adjusted under 35 U.S.C. 154(b) by 64 days.

(21) Appl. No.: 17/592,076

(22) Filed: Feb. 3, 2022

(65) Prior Publication Data
US 2023/0243669 A1    Aug. 3, 2023

(51) Int. Cl.
*G01D 5/14* (2006.01)
*E21B 33/03* (2006.01)
*E21B 47/00* (2012.01)

(52) U.S. Cl.
CPC ............ *G01D 5/14* (2013.01); *E21B 33/03* (2013.01); *E21B 47/00* (2013.01)

(58) Field of Classification Search
CPC ..................................................... G01D 5/14
See application file for complete search history.

(56) References Cited

U.S. PATENT DOCUMENTS

| | | | |
|---|---|---|---|
| 4,406,303 A * | 9/1983 | Kilmoyer | H03K 17/945 137/554 |
| 7,155,896 B2 * | 1/2007 | Jansen | F02C 7/232 60/734 |
| 9,103,465 B2 | 8/2015 | Lymberopoulos | |
| 9,163,619 B2 | 10/2015 | Lymberopoulos | |
| 9,441,453 B2 | 9/2016 | Lymberopoulos et al. | |
| 9,671,794 B1 | 6/2017 | Lymberopoulos et al. | |
| 9,890,609 B2 | 2/2018 | Lymberopoulos et al. | |
| 11,384,876 B2 | 7/2022 | Kadavy | |
| 11,506,006 B2 | 11/2022 | Lymberopoulos et al. | |
| 11,519,536 B2 | 12/2022 | Lymberopoulos et al. | |
| 11,530,601 B2 | 12/2022 | Lymberopoulos et al. | |

* cited by examiner

*Primary Examiner* — Walter L Lindsay, Jr.
*Assistant Examiner* — Milton Gonzalez
(74) *Attorney, Agent, or Firm* — Patterson + Sheridan, LLP (57) ABSTRACT

Aspects of the present disclosure relate to obstruction detector assemblies, systems, and related methods for detecting obstructions along oil and gas equipment. In one implementation, an obstruction detector assembly includes a driver housing having an internal chamber and a plurality of fastener openings. The obstruction detector assembly includes a driver stem disposed at least partially in the internal chamber of the driver housing. The driver stem is movable partially out of the internal chamber of the driver housing. The obstruction detector assembly includes a driver head disposed outside of the driver housing and coupled to the driver stem. In one implementation, movement of the driver stem and the driver head is used to detect obstructions (such as a wireline) in a wellhead structure. In one implementation, movement of the driver stem and the driver head is used to detect obstructions (such as sand) in a valve.

12 Claims, 7 Drawing Sheets

OBSTRUCTION DETECTOR ASSEMBLIES, SYSTEMS, AND RELATED METHODS FOR DETECTING OBSTRUCTIONS ALONG OIL AND GAS EQUIPMENT

BACKGROUND

Field

Aspects of the present disclosure relate to obstruction detector assemblies, systems, and related methods for detecting obstructions along oil and gas equipment. In one implementation, an obstruction detector assembly is configured to detect obstructions (such as a wireline) in a wellhead structure. In one implementation, an obstruction detector assembly is configured to detect obstructions (such as sand) in a valve.

Description of the Related Art

Obstructions along oil and gas equipment can damage the equipment and can hinder operations, resulting in increased costs and operational delays. As an example, an obstruction in the form of a wireline can be damaged when a valve is closed on the wireline. Flowing of operations fluids can also damage the wireline. As another example, an obstruction in the form of sand build-up can prevent a valve from opening or closing, which can damage the valve and/or delay operations.

Therefore, there is a need in the art for obstruction detector assemblies that detect obstructions along oil and gas equipment to facilitate reduced costs, streamlined operational speeds, and reduced or eliminated probabilities of damage to equipment.

SUMMARY

Aspects of the present disclosure relate to obstruction detector assemblies, systems, and related methods for detecting obstructions along oil and gas equipment. In one implementation, an obstruction detector assembly is configured to detect obstructions (such as a wireline) in a wellhead structure. In one implementation, an obstruction detector assembly is configured to detect obstructions (such as sand) in a valve.

In one implementation, an obstruction detector assembly includes a driver housing having an internal chamber and a plurality of fastener openings. The obstruction detector assembly includes a driver stem disposed at least partially in the internal chamber of the driver housing. The driver stem is movable partially out of the internal chamber of the driver housing. The obstruction detector assembly includes a driver head disposed outside of the driver housing and coupled to the driver stem.

In one implementation, an obstruction detector assembly for wellhead structures includes a ring flange. The ring flange includes a first outer surface, a second outer surface, and a plurality of fastener openings extending from the first outer surface to the second outer surface. The ring flange includes a central opening, a first inner surface, a second inner surface, and an inner circumferential recess separating the first inner surface and the second inner surface. The obstruction detector assembly includes a driver housing coupled to the ring flange and having an internal chamber, and a driver stem disposed at least partially in the internal chamber of the driver housing. The driver stem is movable partially out of the internal chamber of the driver housing. The obstruction detector assembly includes a driver head disposed outside of the driver housing and coupled to the driver stem. The driver head is disposed in the inner circumferential recess and movable into and out of the central opening of the ring flange.

In one implementation, an obstruction detector assembly for valves includes a driver housing. The driver housing includes an internal chamber, and a plurality of fastener openings sized and spaced to align with a plurality of valve fastener openings of a valve housing. The obstruction detector assembly includes a driver stem disposed at least partially in the internal chamber of the driver housing. The driver stem is movable partially out of the internal chamber of the driver housing. The obstruction detector assembly includes a driver head disposed outside of the driver housing and coupled to the driver stem.

BRIEF DESCRIPTION OF THE DRAWINGS

So that the manner in which the above-recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one implementation may be beneficially utilized on other implementations without specific recitation.

DETAILED DESCRIPTION

Aspects of the present disclosure relate to obstruction detector assemblies, systems, and related methods for detecting obstructions along oil and gas equipment. In one implementation, an obstruction detector assembly includes a driver housing having an internal chamber and a plurality of fastener openings. The obstruction detector assembly includes a driver stem disposed at least partially in the internal chamber of the driver housing. The driver stem is movable partially out of the internal chamber of the driver housing. The obstruction detector assembly includes a driver head disposed outside of the driver housing and coupled to the driver stem. In one implementation, movement of the driver stem and the driver head is used to detect obstructions (such as a wireline) in a wellhead structure. In one implementation, movement of the driver stem and the driver head is used to detect obstructions (such as sand) in a valve.

The disclosure contemplates that terms such as "couples," "coupling," "couple," and "coupled" may include but are not limited to welding, interference fitting, and/or fastening such as by using bolts, threaded connections, pins, and/or screws. The disclosure contemplates that terms such as "couples," "coupling," "couple," and "coupled" may include but are not limited to integrally forming. The disclosure contemplates that terms such as "couples," "coupling," "couple," and "coupled" may include but are not limited to direct coupling and/or indirect coupling, such as indirect coupling through components such as links.

Figure 1:
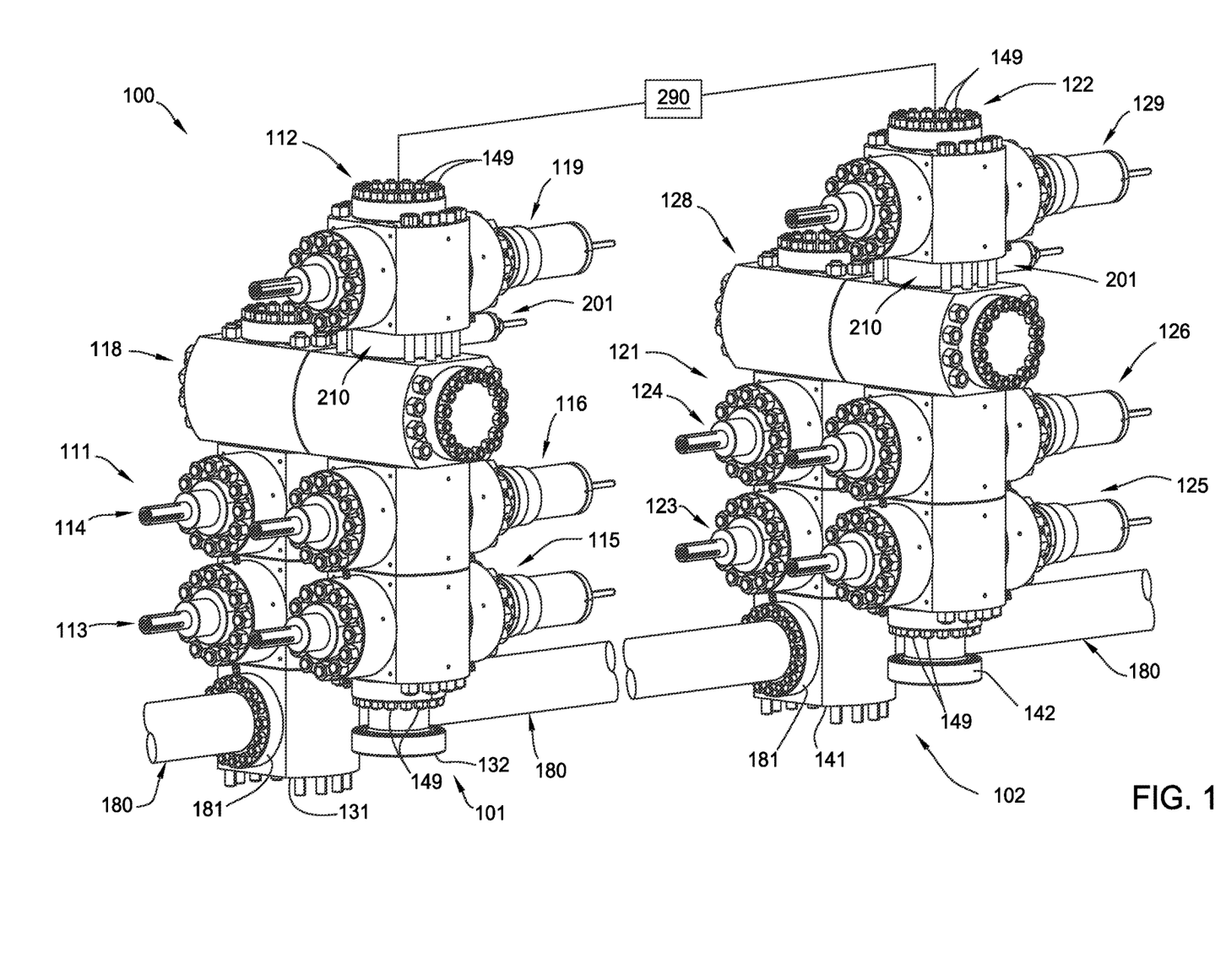
FIG. 1 is a schematic isometric view of a wellhead system having a plurality of wellhead structures at a wellsite, according to one implementation.

FIG. 1 is a schematic isometric view of a wellhead system 100 having a plurality of wellhead structures 101, 102 at a wellsite, according to one implementation. FIG. 1 shows two wellhead structures 101, 102. Each wellhead structure 101, 102 is fluidly connected to a respective well. Each wellhead structure 101, 102 includes a respective first valve assembly 111, 121 and a respective second valve assembly 112, 122. A respective fracture header 118, 128 couples the respective first valve assembly 111, 121 to the respective second valve assembly 112, 122.

Each respective first valve assembly 111, 121 includes a first manifold valve 113, 123 coupled to a second manifold valve 114, 124. Each second manifold valve 114, 124 is coupled to the respective fracture header 118, 128. Each respective second valve assembly 112, 122 includes a first frac valve 115, 125 coupled to a second frac valve 116, 126. Each second frac valve 116, 126 is coupled to the respective fracture header 118, 128. A respective swab valve 119, 129 is coupled to each respective fracture header 118, 128. Each first valve assembly 111, 121 includes, respectively, a first bottom block 131 and a second bottom block 141. Each second valve assembly 112, 122 includes a respective adaptor flange 132, 142 that is configured to couple to the respective well.

Each of the wellhead structures 101, 102 is configured to couple to a pump manifold, such as a frac manifold, to pump operations fluids (such as frac fluids and/or acids) downhole into the wells.

The present disclosure contemplates that additional wellhead structures can be included to fluidly connect to additional wells. Spools 180 (three are shown), such as trunk lines, are coupled to and between the wellhead structures 101, 102. In one embodiment, which can be combined with other embodiments, a wellbore treatment operation using the wellhead system 100 shown in FIG. 1 may further include connecting each wellhead structure 101, 102 to a respective well. The wellbore treatment operation may further include connecting each bottom block 131, 141 to the snake spool assemblies 180. Each bottom block 131, 141 is a manifold header. A flange 181 of each spool 180 is coupled to each respective bottom block 131, 141.

The wellbore treatment operation may further include pumping treatment fluid through the spools 180, sequentially through wellhead structures 101, 102, and into each well. The wellbore treatment operation may include sequentially pumping treatment fluid into each well such that the treatment fluid is pumped into each well in turn, one well at a time. The wellbore treatment operation may further include closing the first manifold valve 113 or 123 and the second manifold valve 114 or 124 of the wellhead structure 101 or 102 associated with wells that are not to receive the treatment fluid, and opening the first manifold valve 113 or 123 and the second manifold valve 114 or 124 of the wellhead structure 101 or 102 associated with the well that is to receive the treatment fluid. The wellbore treatment operation may further include closing the first manifold valve 113 or 123 and the second manifold valve 114 or 124 of the wellhead structure 101 or 102 associated with the well that received the treatment fluid, and opening the first manifold valve 113 or 123 and the second manifold valve 114 or 124 of the wellhead structure 101 or 102 associated with another well that is to receive the treatment fluid. The wellbore treatment operation may thus include using the sequential closing and opening of the first manifold valve 113 or 123 and the second manifold valve 114 or 124 of each wellhead structure 101, 102 to direct the treatment fluid into each well sequentially.

Each second valve assembly 112, 122 includes a respective obstruction detector assembly 201 coupled between the respective swab valve 119, 129 and the respective fracture header 118, 128. Each obstruction detector assembly 201 can be the obstruction detector assembly 201 shown in FIGS. 2-4 as further described below.

Figure 2:
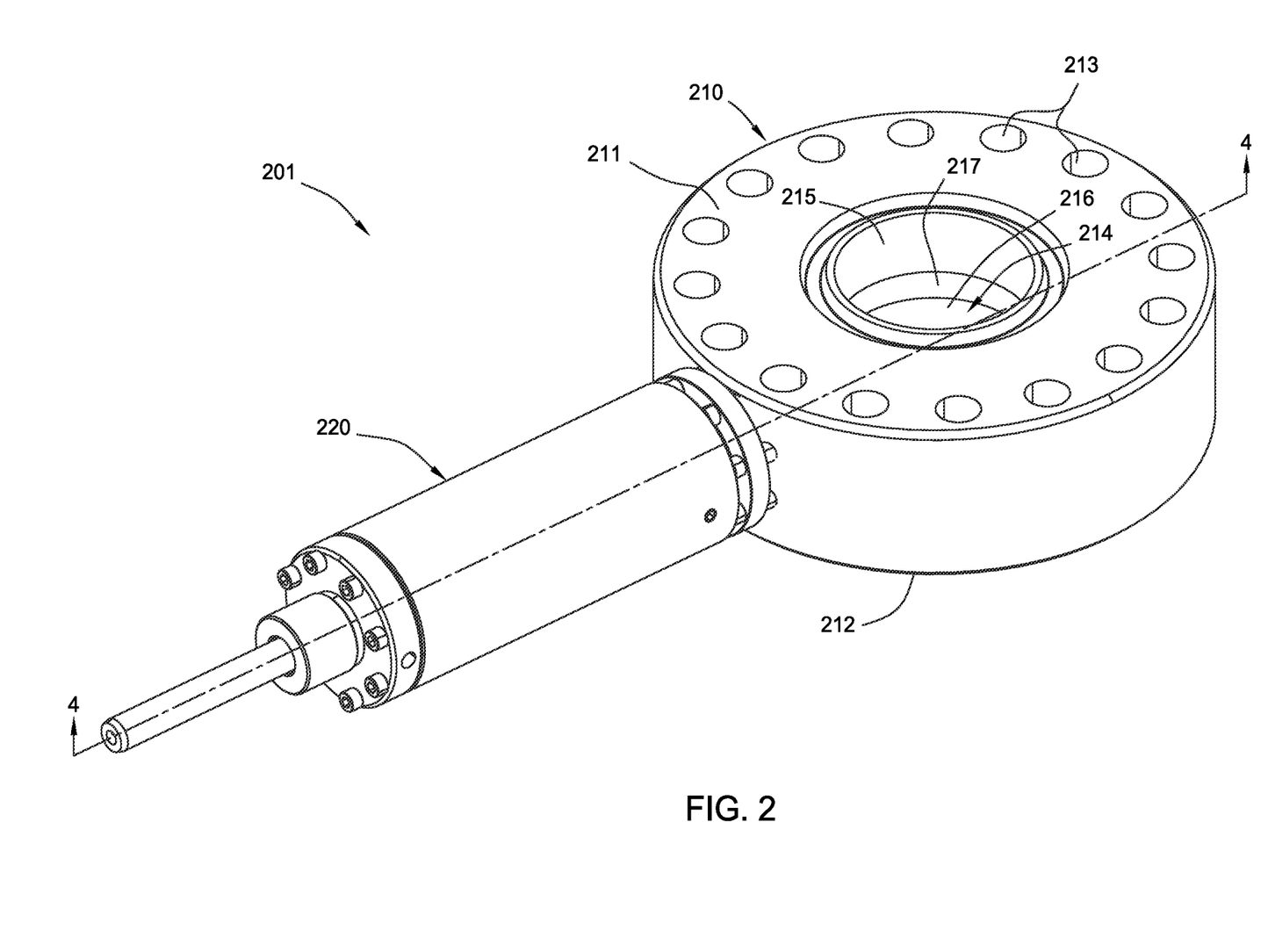
FIG. 2 is a schematic isometric top view of an obstruction detector assembly, according to one implementation.
Figure 3:
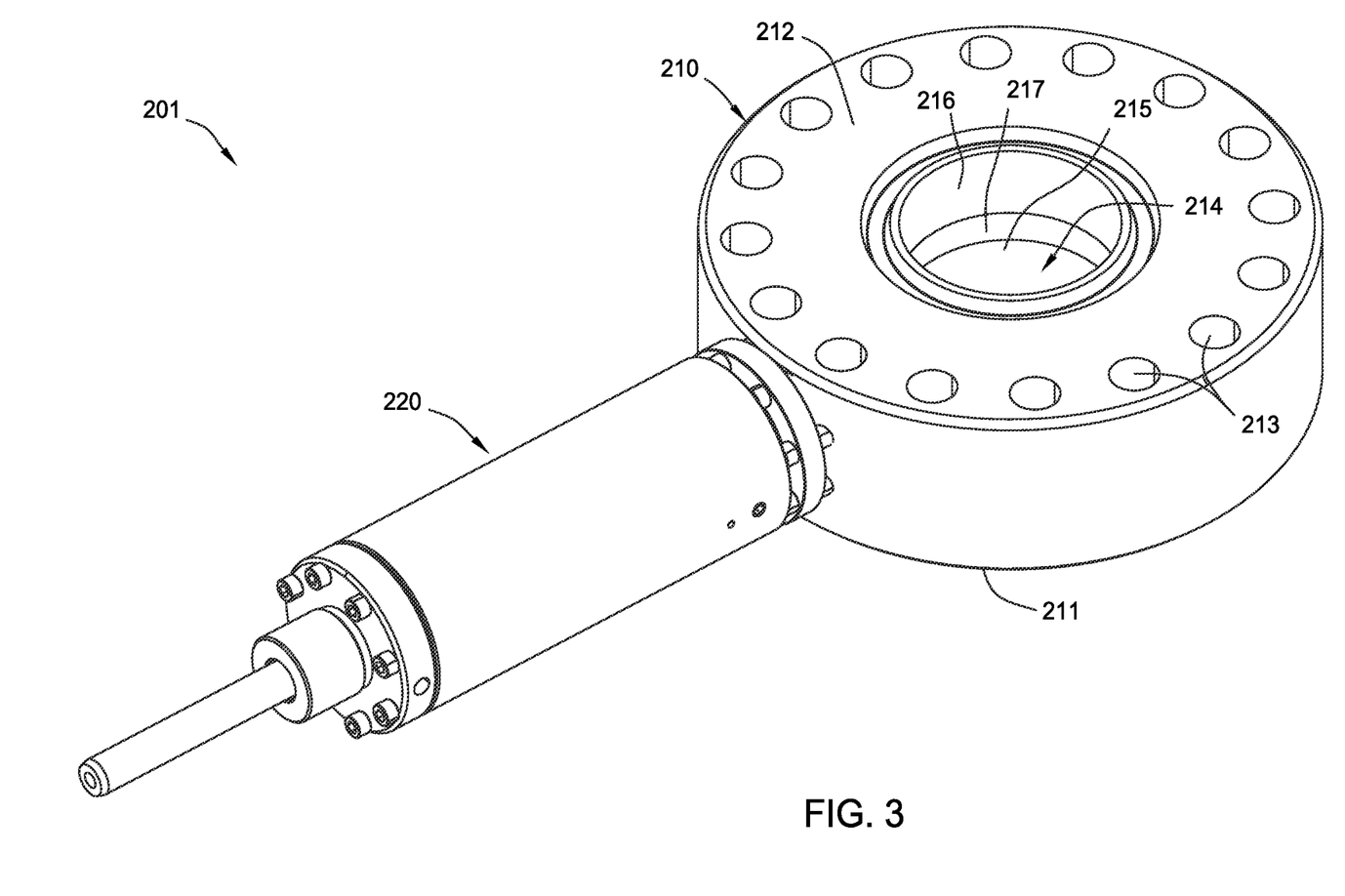
FIG. 3 is a schematic isometric bottom view of the obstruction detector assembly shown in FIG. 2, according to one implementation.

FIG. 2 is a schematic isometric top view of an obstruction detector assembly 201, according to one implementation. FIG. 3 is a schematic isometric bottom view of the obstruction detector assembly 201 shown in FIG. 2, according to one implementation. The obstruction detector assembly 201 includes a ring flange 210. The ring flange 210 includes a first outer surface 211, a second outer surface 212, and a plurality of fastener openings 213 extending from the first outer surface 211 to the second outer surface 212. The ring flange 210 includes a central opening 214, a first inner surface 215, a second inner surface 216, and an inner circumferential recess 217 separating the first inner surface 215 and the second inner surface 216.

Figure 4:
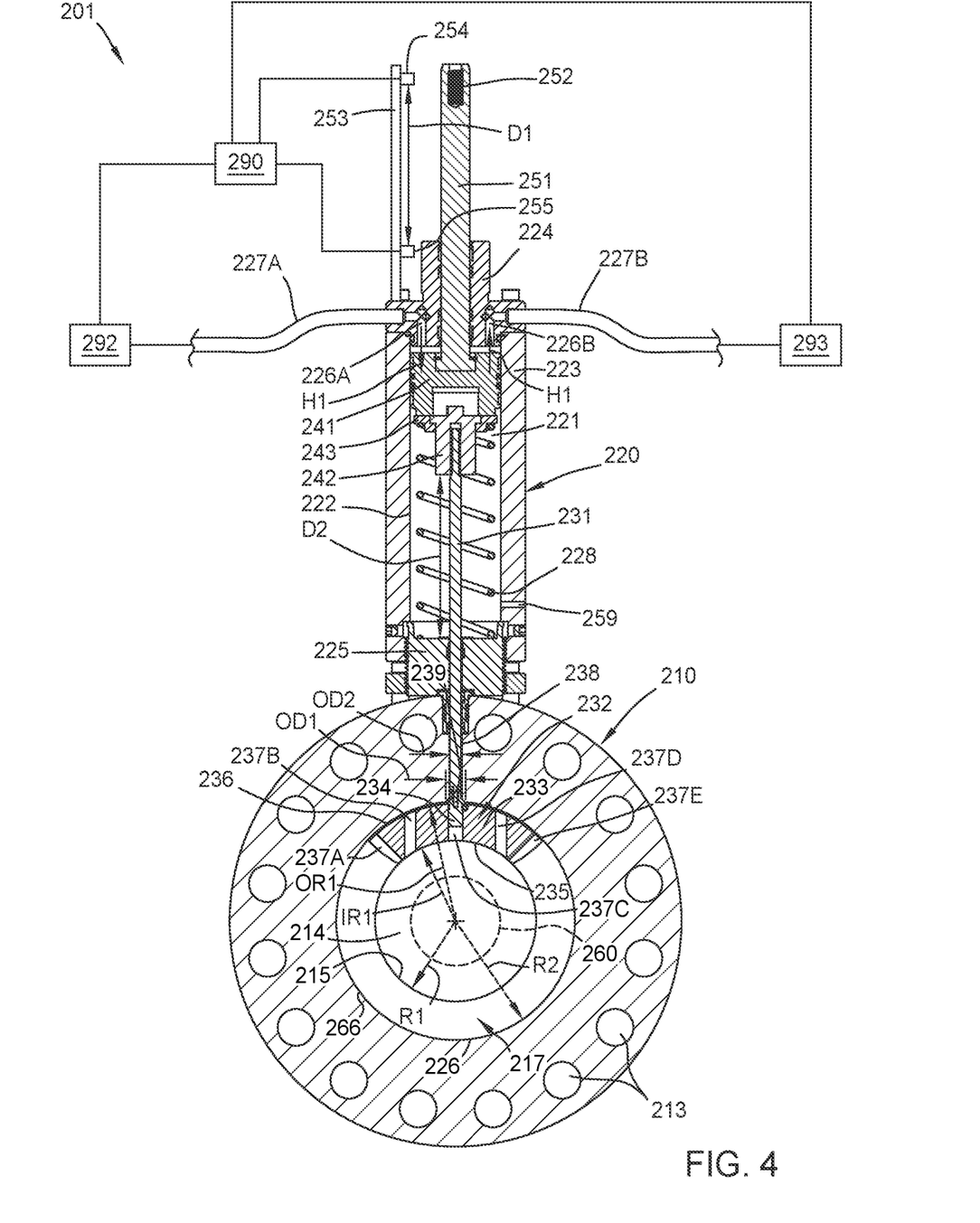
FIG. 4 is a schematic bottom cross-sectional view of the obstruction detector assembly shown in FIGS. 2 and 3, along Section 4-4 shown in FIG. 2, according to one implementation.

FIG. 4 is a schematic bottom cross-sectional view of the obstruction detector assembly 201 shown in FIGS. 2 and 3, along Section 4-4 shown in FIG. 2, according to one implementation. The obstruction detector assembly 201 includes a driver housing 220 coupled to the ring flange 210 and having an internal chamber 221. The obstruction detector assembly 201 includes a driver stem 231 disposed at least partially in the internal chamber 221 of the driver housing 220. The driver stem 231 is movable partially out of the internal chamber 221. The obstruction detector assembly 201 includes a driver head 232 disposed outside of the driver housing 220 and coupled to the driver stem 231. The driver head 232 is disposed in the inner circumferential recess 217 and is movable into and out of the central opening 214 of the ring flange 210.

In the implementation shown in FIG. 4, the driver head 232 includes an arcuate plate 233 coupled to the driver stem 231 through an end block 234. The arcuate plate 233 may be a gate. The arcuate plate 233 includes an inner face 235 having an inner radius of curvature IR1 that is within a difference of 5% or less relative to an outer radius R1 of the central opening 214 of the ring flange 210. The arcuate plate 233 includes an outer face 236 having an outer radius of curvature OR1 that is within a difference of 5% or less relative to an outer radius R2 of the inner circumferential recess 217 of the ring flange 210. The arcuate plate 233 includes a plurality of openings 237A-237E extending from the inner face 235 and to the outer face 236.

The end block 234 of the driver head 232 includes an outer shoulder 239 having an outer diameter OD1 that is larger than an outer diameter OD2 of the driver stem 231.

The outer diameter OD1 of the outer shoulder 239 is larger than an opening 238 formed in the ring flange 210. The driver stem 231 is disposed through the opening 238 formed in the ring flange 210.

The obstruction detector assembly 201 includes a piston head 241 disposed in the internal chamber 221 of the driver housing 220. The piston head 241 is movable along an inner surface 222 of the driver housing 220. The driver rod 231 is coupled to the piston head 241 through a piston rod 242 and a piston cap 243.

The obstruction detector assembly 201 includes a detector stem 251 coupled to the driver stem 231 through the piston head 241, the piston cap 243, and the piston rod 242. The obstruction detector assembly 201 includes a target 252 coupled to the detector stem 251, a mount plate 253 coupled to the driver housing 220, a first switch 254 mounted to the mount plate 253, and a second switch 255 mounted to the mount plate 253 and spaced from the first switch 254. Each of the first switch 254 and the second switch 255 is a magnetic proximity switch configured to measure the target 252 (e.g. sense the proximity of the target 252 relative to the first and second switches 254, 255). The target 252 may be a magnet. In one embodiment, which can be combined with other embodiments, the mount plate 253 is a bracket, such as an L-shaped bracket.

The driver housing 220 includes a sleeve 223, a first end ring 224 coupled (e.g., fastened) to the sleeve 223 and disposed about the detector stem 251, and a second end ring 225 coupled (e.g., threaded) to the sleeve 223 and disposed about the driver stem 231. The obstruction detector assembly 201 includes a plurality of fluid openings 226A, 226B formed in the first end ring 224, and a plurality of hydraulic lines 227A, 227B fluidly connected to the plurality of fluid openings 226A, 226B.

The obstruction detector assembly 201 includes one or more biasing elements 228 (one is shown in FIG. 4) disposed in the internal chamber 221 of the driver housing 220 and configured to bias the piston head 241, the driver stem 231, and the detector stem 251 away from the ring flange 210. In the implementation shown in FIG. 4, the biasing element 228 is a spring. In one embodiment, which can be combined with other embodiments, the one or more biasing elements 228 are disposed between the piston cap 243 and the second end ring 225. The one or more biasing elements 228 bias the piston head 241, the driver stem 231, and the detector stem 251 away from the ring flange 210.

The ring flange 210 is configured to couple to one of the wellhead structures 101, 102. The plurality of fastener openings 213 of the ring flange 210 are sized and spaced to align with a plurality of fastener openings of the fracture headers 118, 128 and a plurality of fastener openings of the swab valves 119, 129 of the wellhead structures 101, 102.

A plurality of fasteners 149 (shown in FIG. 1) are disposed through the fastener openings of the respective swab valves 119, 129, through the fastener openings 213 of the respective ring flanges 210, through the fastener openings of the respective fracture headers 118, 128, through fastener openings of the respective second frac valves 116, 126, and through fastener openings of the respective first frac valves 115, 125.

A hydraulic fluid H1 is supplied to the internal chamber 221 through the fluid openings 226A, 226B above the piston 241 (e.g. the side of the piston 241 opposite the one or more biasing elements 228) to extend the driver stem 231 and the driver head 232. The force of the hydraulic fluid H1 applied to the piston head 241 moves the piston head 241 toward the ring flange 210 and against the force of the one or more biasing elements 228. The one or more biasing elements 228 are compressed between the piston cap 243 and the second end ring 225 as the piston head 241 moves to extend the driver stem 231 and the driver head 232 into the ring flange 210. The hydraulic fluid H1 is exhausted from the internal chamber 221 through the fluid openings 226A, 226B to retract the driver stem 231 and the driver head 232. The force of the one or more biasing elements 228 are used retract the driver stem 231 and the driver head 232 as the hydraulic fluid H1 is exhausted from the internal chamber 221. One or more openings 259 are formed in the sleeve 223 to expose a portion of the internal chamber 221 to ambient air. An atmospheric pressure applied to the piston head 241 using the ambient air facilitates retracting the piston head 241 away from the ring flange 210. In one embodiment, which can be combined with other embodiments, fluid (such as fluid from the well) flowing through the wellhead structure 101 or 102 can apply a pressure to the arcuate plate 233 and/or the end block 234 to facilitate retracting the arcuate plate 233 and the driver stem 231.

During an obstruction detection operation, the arcuate plate 233 of the driver head 232 is extended toward the central opening 214 of the ring flange 210. If an obstruction, such as a wireline 260 (shown in broken lines in FIG. 4), is disposed in the central opening 214, then the arcuate plate 233 will contact the wireline 260 and stop the detector stem 251. The stoppage of the detector stem 251 stops the target 252 before the target 252 reaches the second switch 255, which indicates to a controller 290 that there is the obstruction 260 disposed in the internal volume 214. The detection of the obstruction 260 in the internal volume 214 can indicate that the obstruction is in the respective first valve assembly 111, 121 or second valve assembly 112, 122. Based on the detection of the obstruction, the controller 290 can control the respective valves of the first valve assembly 111, 121 or second valve assembly 112, 122 such that the respective valves do not close to engage the obstruction. If the target 252 reaches the second switch 255, then a determination is made that the central opening 214 of the ring flange 210 is clear of obstructions. The first switch 254 and/or the second switch 255 generate one or more signals that the controller 290 uses to determine an obstructed condition or an unobstructed condition for the ring flange 210. The controller 290 determines an obstruction status of the ring flange 210 in an automated manner, reducing the amount of manual operation needed from operations personnel.

The controller 290 is in communication with the first switch 254 and the second switch 255 to detect movement of the target 252. The controller 290 is in communication with one or more fluid sources 292, 293 to control the supply of the hydraulic fluid H1 to the driver housing 220, and to control the exhausting of the hydraulic fluid H1 from the driver housing 220. One or more vacuum sources may be used in relation to the hydraulic fluid H1. The controller 290 controls the extending and retracting of the driver stem 231, the detector stem 251, the target 252, the piston head 241, and the driver head 232. The controller 290 uses the first and second switches 254, 255 to detect movement of the target 252 and determine if any obstruction is in the central opening 214 of the ring flange 210. As shown in FIG. 1, the controller 290 is in communication with the valve assemblies 111, 112, 121, 122 to actuate (e.g. open and close) any one or more of the valves 113-116, 123-126, 119, 129.

Figure 7:
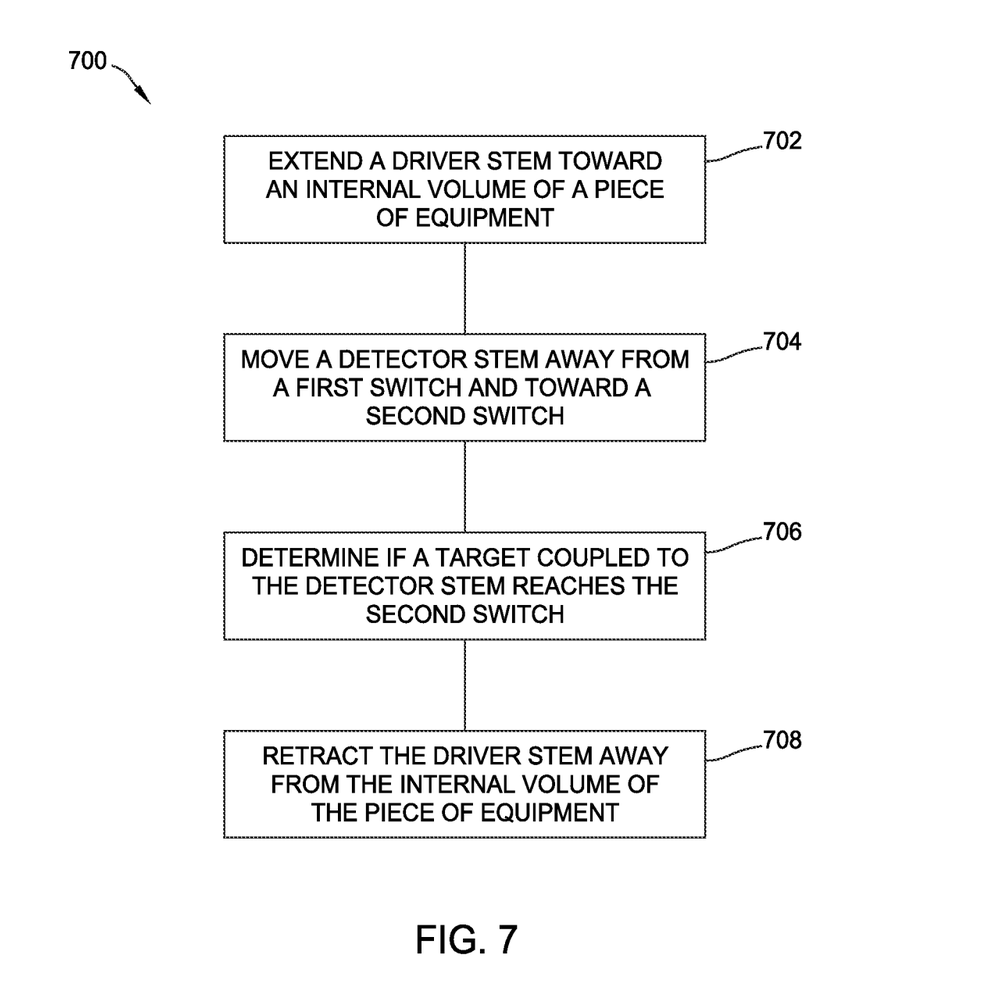
FIG. 7 is a schematic block diagram view of a method of detecting an obstruction in oil and gas equipment, according to one implementation.

The controller 290 can include instructions (such as software) stored on a memory that, when executed by a processor, control the operations of the wellhead structures 101, 102 and the obstruction detector assembly 201. The instructions of the controller 290 can use simple automation module for internet explorer (SAMI) automation software. In one embodiment, which can be combined with other embodiments, the instructions of the controller 290 (when executed by the processor) cause the operations 702, 704, 706, 708 of the method 700 to be conducted.

The first switch 254 and the second switch 255 are spaced from each other by a distance D1 that is greater than the outer radius R1 of the central opening 214. In one embodiment, which can be combined with other embodiments, the distance D1 is equal to or greater than a diameter (which is double the outer radius R1) of the central opening 214. In one embodiment, which can be combined with other embodiments, the distance D1 is lesser than a diameter (which is double the outer radius R2) of the inner circumferential recess 217.

In a retracted position (shown in FIG. 4) where the outer shoulder 239 abuts against the ring flange 210, the piston rod 242 is spaced from the second end ring 225 by a distance D2. In one embodiment, which can be combined with other embodiments, the distance D2 is greater than the diameter (which is double the outer radius R1) of the central opening 214 and lesser than the diameter (which is double the outer radius R2) of the inner circumferential recess 217. The distance D2 facilitates allowing the arcuate plate 233 to traverse the central opening 214 to contact any obstruction, and facilitates stopping the arcuate plate 233 before the arcuate plate abuts against a circumferential inner surface 266 defined by the inner circumferential recess 217. The distance D1 facilitates the target 252 stopping before reaching the second switch 255 if the arcuate plate 233 contacts and stops against an obstruction in the central opening 214. The distance D1 facilitates the target 252 reaching the second switch 255 if the arcuate plate 233 traverses past the central opening 214 without contacting an obstruction in the central opening 214.

Figure 5:
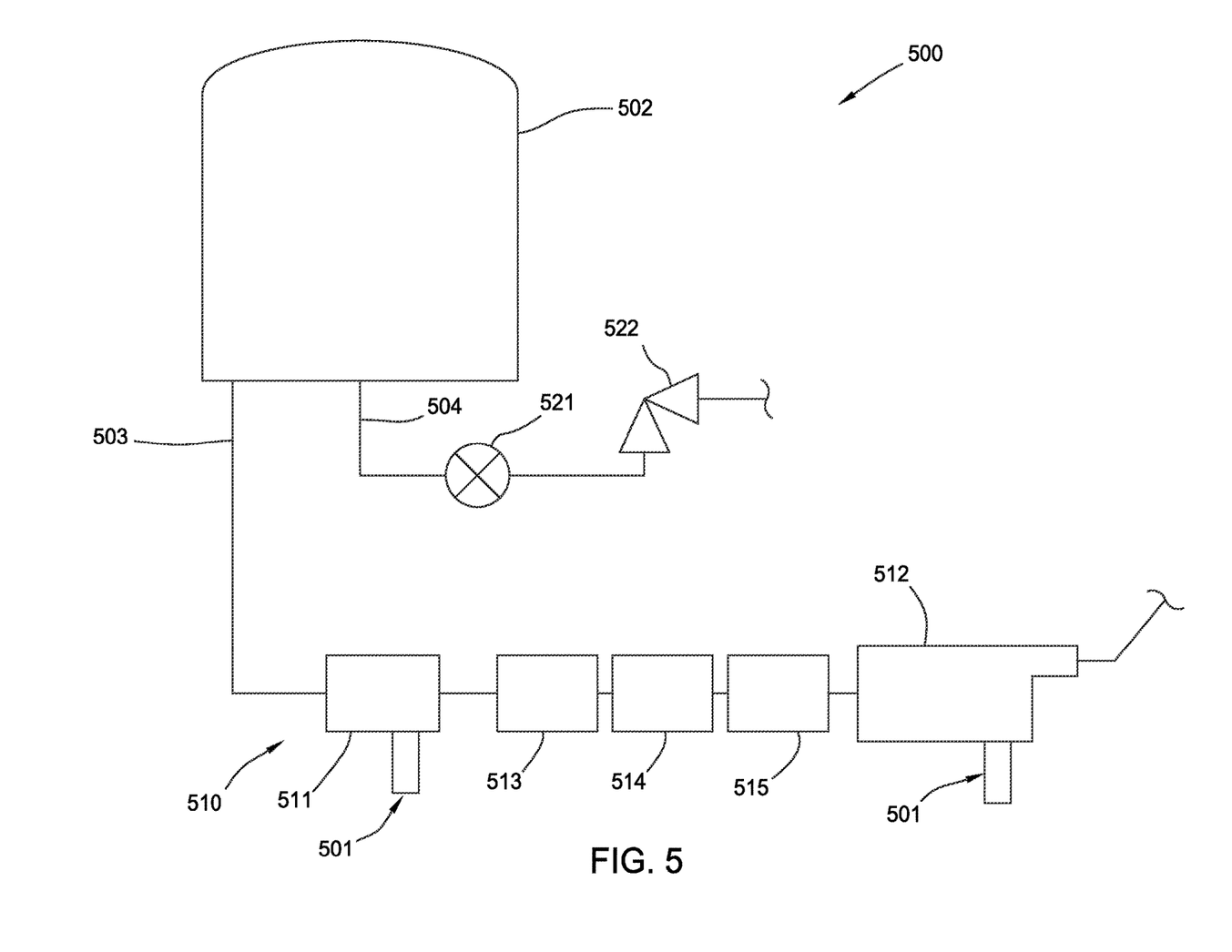
FIG. 5 is a schematic plan view of a valve system coupled to a solids separator, according to one implementation.

FIG. 5 is a schematic plan view of a valve system 510 coupled to a solids separator 502, according to one implementation. The valve system 510 and the solids separator 502 are part of a separation system 500. The valve system 510 is disposed along a first outlet line 503 coupled to the solids separator 502. A second outlet line 504 is coupled to the solids separator 502.

The solids separator 502 is configured to separate solids (such as sand) from fluids (such as oil or gas). The separated solids exit the solids separator 502 through the second outlet line 504. The separated fluids exit the solids separator 502 through the first outlet line 503. The second outlet line 504 includes one or more valves 521, 522 (two are shown). A first valve 521 is a ball valve. The first valve 521 can be a relief valve or an excess flow valve. A second valve 522 is an angle valve.

The first outlet line 503 includes one or more valves 511, 512 (two are shown). A first valve 511 can be an indicator valve that indicates flow. A second valve 512 can be a choke valve. The first outlet line 503 also includes a first fail open valve 513, a second fail open valve 514, and a fail close valve 515, all positioned between the first and second valves 511, 512. An obstruction detector assembly 501 is coupled to each of the first valve 511 and the second valve 512.

Figure 6:
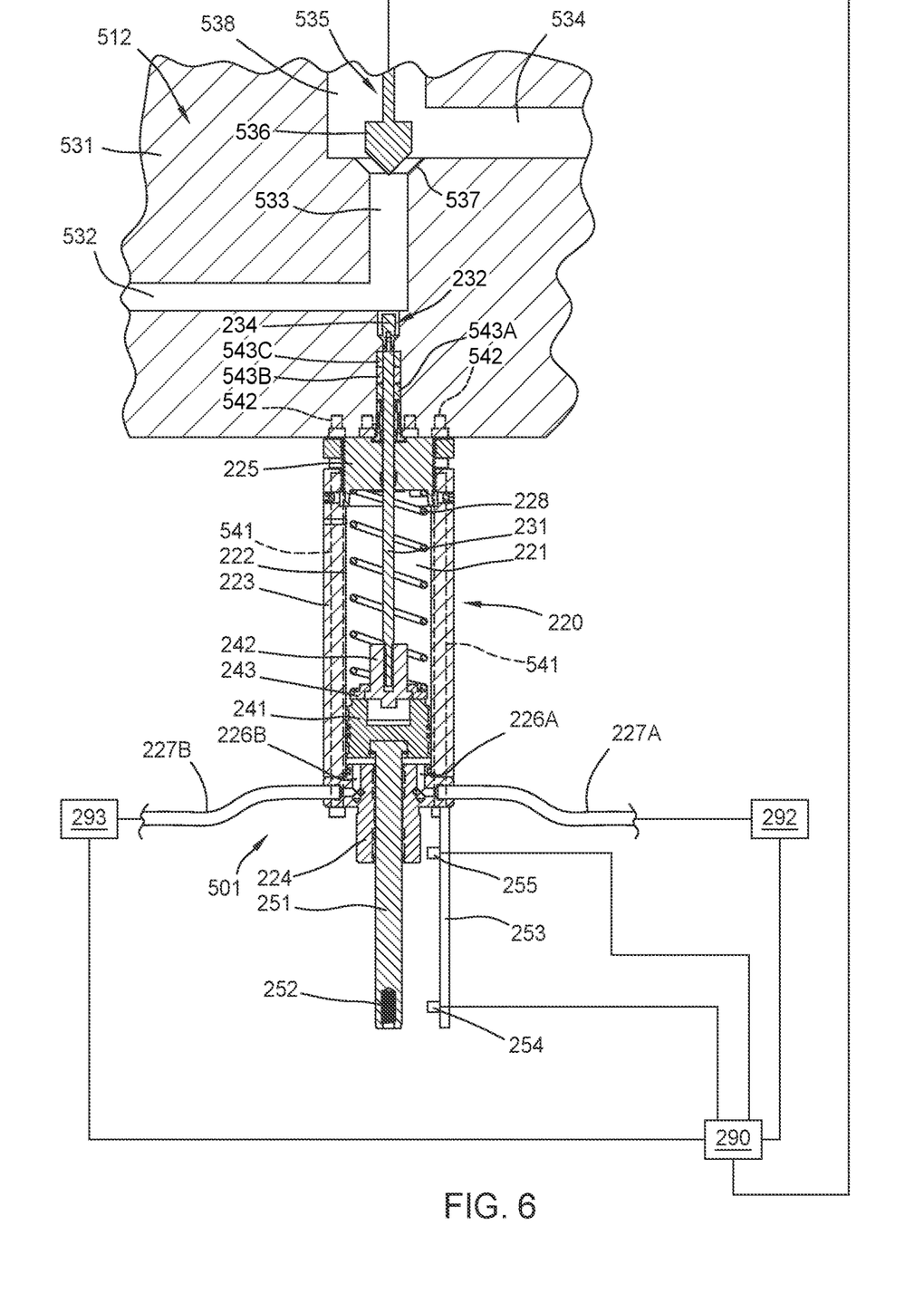
FIG. 6 is a schematic partial view of the obstruction detector assembly coupled to a valve of the valve system shown in FIG. 5, according to one implementation.

FIG. 6 is a schematic partial view of the obstruction detector assembly 501 coupled to the second valve 512 shown in FIG. 5, according to one implementation. The obstruction detector assembly 501 is similar to the obstruction detector assembly 201 shown in FIGS. 2-4, and includes one or more of the aspects, features, components, and/or properties thereof. In the implementation shown in FIG. 6, the obstruction detector assembly 501 omits the arcuate plate 233 and the ring flange 210.

The second valve 512 is a choke valve. The second valve 512 includes an inlet passage 532, a seat passage 533, and an outlet passage 534. A head 536 of a valve stem 535 is configured to abut against a seat 537 of a valve housing 531 and move away from the seat 537 to open the second valve 512. The driver stem 231 and the end block 234 are configured to move into the seat passage 533 to detect one or more obstructions such as solids (for example sand) in the seat passage 533. The present disclosure contemplates that the obstruction detector assembly 501 can be oriented to detect obstruction(s) in the inlet passage 532, obstruction(s) in the outlet passage 534, and/or obstruction(s) adjacent the head 536 in a head chamber 538.

The sleeve 223 of the driver housing 220 includes a plurality of fastener openings 541 sized and spaced to align with a plurality of valve fastener openings 542 of the valve housing 531. One or more expandable packing rings 543A-543C are disposed about the driver stem 231.

In the implementation shown in FIG. 6, the controller 290 is in communication with the second valve 512 and the obstruction detector assembly 501 to determine if an obstruction (such as sand) is disposed in the second valve 512. The controller 290 is also in communication with the second valve 512 to control actuation of the second valve 512 open and closed, such as by moving the valve stem 535. The instructions of the controller 290 can use simple automation modules for internet explorer (SAMI) automation software that controls the operation of the second valve 512 using one or more operational parameters. In one embodiment, which can be combined with other embodiments, the one or more operational parameters include a measured flow rate, a measured pressure, and/or other measured parameters of fluid flowing through the second valve 512. The controller 290 determines an obstruction status of the second valve 512 in an automated manner, reducing the amount of manual operation needed from operations personnel.

FIG. 7 is a schematic block diagram view of a method 700 of determining an obstruction status of oil and gas equipment, according to one implementation. Operation 702 includes extending a driver stem toward an internal volume of a piece of equipment. In one embodiment, which can be combined with other embodiments, the piece of equipment is a flange ring coupled to a wellhead structure. In one embodiment, which can be combined with other embodiments, the piece of equipment is a valve housing of a valve, such as a choke valve. In one embodiment, which can be combined with other embodiments, the driver stem is moved by supplying a hydraulic fluid into an internal chamber of a driver housing. The driver stem is partially disposed in the internal chamber of the driver housing.

Operation 704 includes moving a detector stem in a direction away from a first switch and toward a second switch spaced from the first switch. The detector stem is coupled to the driver stem. In one embodiment, which can be combined with other embodiments, the detector stem is disposed partially in the internal chamber of the driver housing. In one embodiment, which can be combined with other embodiments, the movement of the driver stem in operation 702 and the movement of the detector stem in operation 704 occur simultaneously.

Operation 706 includes determining if a target coupled to the detector stem reaches the second switch. If the target stops before reaching the second switch, then a determination is made that there is an obstruction disposed in the internal volume of the piece of equipment, and a determination is made that the piece of equipment has an obstructed condition. In one embodiment, which can be combined with other embodiments, the obstruction is a wireline or sand. If the target reaches the second switch, then a determination is made that the internal volume of the piece of equipment is clear of obstructions, and a determination is made that the piece of equipment has an unobstructed condition.

Operation 708 includes retracting the driver stem away from the internal volume of the piece of equipment. In one embodiment, which can be combined with other embodiments, the detector stem is moved by supplying a hydraulic fluid into an internal chamber in which the detector stem is partially disposed.

Benefits of the present disclosure include detecting obstructions in oil and gas equipment in an automated manner; reduced amounts of manual labor; reduced expenditures of resources; reduced costs; streamlined operational speeds; and reduced or eliminated probabilities of damage to oil and gas equipment (such as wirelines and valves).

It is contemplated that one or more of the aspects disclosed herein may be combined. Moreover, it is contemplated that one or more of these aspects may include some or all of the aforementioned benefits. As an example, the present disclosure contemplates that one or more aspects, features, operations, components, and/or properties of the wellhead system 100, the obstruction detector assembly 201, the separation system 500, the obstruction detector assembly 501, and/or the method 700 may be combined. For example, one or more of the operations described for the wellhead system 100 and the obstruction detector assembly 201 can be combined with one or more of the operations 702, 704, 706, 708 described for the method 700 and/or one or more of the operations described for the separation system 500 and the obstruction detector assembly 501.

It will be appreciated by those skilled in the art that the preceding embodiments are exemplary and not limiting. It is intended that all modifications, permutations, enhancements, equivalents, and improvements thereto that are apparent to those skilled in the art upon a reading of the specification and a study of the drawings are included within the scope of the disclosure. It is therefore intended that the following appended claims may include all such modifications, permutations, enhancements, equivalents, and improvements. The disclosure also contemplates that one or more aspects of the embodiments described herein may be substituted in for one or more of the other aspects described. The scope of the disclosure is determined by the claims that follow.

We claim:

1. An obstruction detector assembly for wellhead structures, comprising:
   a ring flange comprising:
      a first outer surface,
      a second outer surface,
      a plurality of fastener openings extending from the first outer surface to the second outer surface,
      a central opening,
      a first inner surface,
      a second inner surface, and
      an inner circumferential recess separating the first inner surface and the second inner surface; and
   a driver housing coupled to the ring flange and comprising an internal chamber;
   a driver stem disposed at least partially in the internal chamber of the driver housing, the driver stem is movable partially out of the internal chamber of the driver housing; and
   a driver head disposed outside of the driver housing and coupled to the driver stem, the driver head disposed in the inner circumferential recess and movable into and out of the central opening of the ring flange.

2. The obstruction detector assembly of claim 1, a biasing element disposed in the driver housing and configured to bias the driver stem away from the ring flange.

3. The obstruction detector assembly of claim 1, wherein the driver head comprises an arcuate plate.

4. The obstruction detector assembly of claim 3, wherein the arcuate plate comprises an inner face having an inner radius of curvature that is within a difference of 5% or less relative to an outer radius of the central opening of the ring flange, and the arcuate plate comprises an outer face having an outer radius of curvature that is within a difference of 5% or less relative to an outer radius of the inner circumferential recess of the ring flange.

5. The obstruction detector assembly of claim 4, wherein the arcuate plate comprises a plurality of openings extending from the inner face and to the outer face.

6. The obstruction detector assembly of claim 1, further comprising a piston head disposed in the internal chamber of the driver housing and movable along an inner surface of the driver housing.

7. The obstruction detector assembly of claim 6, further comprising:
   a detector stem coupled to the driver stem through the piston head;
   a target coupled to the detector stem;
   a mount plate coupled to the driver housing;
   a first switch mounted to the mount plate; and
   a second switch mounted to the mount plate and spaced from the first switch.

8. The obstruction detector assembly of claim 7, wherein each of the first switch and the second switch is a magnetic proximity switch configured to recognize the target.

9. The obstruction detector assembly of claim 7, wherein the driver housing comprises:
   a sleeve;
   a first end ring coupled to the sleeve and disposed about the detector stem; and
   a second end ring coupled to the sleeve and disposed about the driver stem.

10. The obstruction detector assembly of claim 9, further comprising:
    a plurality of fluid openings formed in the first end ring; and
    a plurality of hydraulic lines fluidly connected to the plurality of fluid openings.

11. The obstruction detector assembly of claim 6, further comprising one or more biasing elements disposed in the internal chamber of the driver housing and configured to bias the piston head and the driver stem away from the ring flange.

12. The obstruction detector assembly of claim 1, wherein the plurality of fastener openings of the ring flange are sized and spaced to align with a plurality of fastener openings of a wellhead structure.

* * * * *